US012614376B2

(12) United States Patent
Hamid et al.

(10) Patent No.:     US 12,614,376 B2
(45) Date of Patent:          Apr. 28, 2026

(54) MATERIAL FLOWS

(71) Applicant: Bühler UK Ltd., London (GB)

(72) Inventors: Gabriel Hamid, Loughton (GB); Benjamin Davis, London (GB)

(73) Assignee: Bühler UK Ltd. (GB)

( * ) Notice: Subject to any disclaimer, the term of this patent is extended or adjusted under 35 U.S.C. 154(b) by 0 days.

(21) Appl. No.: 18/862,828

(22) PCT Filed: May 3, 2023

(86) PCT No.: PCT/EP2023/061731
     § 371 (c)(1),
     (2) Date: Nov. 4, 2024

(87) PCT Pub. No.: WO2023/213913
     PCT Pub. Date: Nov. 9, 2023

(65) Prior Publication Data
     US 2025/0356621 A1      Nov. 20, 2025

(30) Foreign Application Priority Data

May 4, 2022     (EP) ..................................... 22171594

(51) Int. Cl.
     *G06V 10/764*            (2022.01)
     *B07C 5/342*             (2006.01)
                     (Continued)
(52) U.S. Cl.
     CPC .......... *G06V 10/764* (2022.01); *B07C 5/3422*
                     (2013.01); *G06T 3/40* (2013.01);
                     (Continued)
(58) Field of Classification Search
     CPC .. G06V 10/764; G06V 10/7747; G06V 10/82;
               B07C 5/34; B07C 5/342; B07C 5/3422
                     (Continued)

(56) References Cited

U.S. PATENT DOCUMENTS 5,526,119 A * 6/1996 Blit ....................... B07C 5/3422
                                                   356/402
9,498,993 B2 * 11/2016 Kubozono ............. B41J 2/2142
               (Continued)

FOREIGN PATENT DOCUMENTS

CN        113728357 A  * 11/2021  ........... G06T 7/0012
CN        115228769 A  * 10/2022  ............... B07C 5/34
               (Continued)

OTHER PUBLICATIONS

International Search Report and Written Opinion of PCT/EP2023/061731, Jul. 11, 2023, 15 pages.
               (Continued)

*Primary Examiner* — Terrell H Matthews
(74) *Attorney, Agent, or Firm* — Ryan, Mason & Lewis, LLP

(57)                    ABSTRACT

A data processing apparatus for a sorting apparatus, a method for sorting material and a sorting apparatus are disclosed. The data processing apparatus comprises a first data processing entity configured to operate a sorting application for processing of image data from a source of image data and a second data processing entity configured to operate an analysis application using a neural network for processing said image data from the source of image data, the second data processing entity being configured for processing of higher resolution image data than the first data processing entity. An image data resolution converter is provided to reduce the resolution of said image data from the source of image data prior to processing by the sorting application of the first data processing entity.

20 Claims, 5 Drawing Sheets

(51) Int. Cl.

| | | |
|---|---|---|
| *G06T 3/40* | (2006.01) | |
| *G06V 10/72* | (2022.01) | |
| *G06V 10/774* | (2022.01) | |
| *G06V 10/82* | (2022.01) | |
| *G06V 10/94* | (2022.01) | |

(52) U.S. Cl.
CPC .......... *G06V 10/72* (2022.01); *G06V 10/7747* (2022.01); *G06V 10/82* (2022.01); *G06V 10/955* (2022.01); *G06V 2201/06* (2022.01)

(58) Field of Classification Search
USPC ......................................................... 209/577
See application file for complete search history.

(56) References Cited

U.S. PATENT DOCUMENTS

| | | | | |
|---|---|---|---|---|
| 12,347,167 | B2 * | 7/2025 | Markworth | .......... G06V 10/764 |
| 2019/0210067 | A1 * | 7/2019 | Kumar | ................... G06V 10/82 |

FOREIGN PATENT DOCUMENTS

| | | | | | |
|---|---|---|---|---|---|
| EP | 3816857 | A1 | * | 5/2021 | ........... B07C 5/3422 |
| EP | 3912737 | A1 | * | 11/2021 | ............. B07C 5/342 |
| ES | 2993590 | T3 | * | 1/2025 | ............... B65F 3/02 |
| GB | 2576191 | A | * | 2/2020 | ............. G06V 10/82 |
| KR | 102735427 | B1 | * | 11/2024 | .......... G06V 10/761 |
| WO | WO-2022199758 | A1 | * | 9/2022 | ............. G06V 10/58 |

OTHER PUBLICATIONS

Extended European Search Report of European Patent Application No. 22171594.9, Oct. 19, 2022, 11 pages.

J. Bobulski et al., "Waste Classification System Using Image Processing and Convolutional Neural Networks," Advances in Databases and Information Systems, May 16, 2019, pp. 350-361.

N. Kroell et al., "Sensor-based Particle Mass Prediction of Lightweight Packaging Waste Using Machine Learning Algorithms," Waste Management, Oct. 26, 2021, pp. 253-265, vol. 136.

* cited by examiner

MATERIAL FLOWS

This disclosure relates to apparatus and methods for handling material flows, and more particularly sorting and analysing materials based on image data of a flow of material from optical monitoring equipment.

An industrial process can involve processing of large quantities of materials flowing through the process. Constant monitoring of materials may be required at various stages of the process. Monitoring of materials can be performed by specific optical imaging equipment configured to generate digital image data of the material that can then be processed by data processing apparatus. Data signals can be generated by an imaging apparatus such as digital cameras or scanners, optical readers and so on imaging equipment. Signals from the imaging apparatus input into a data processing apparatus can result appropriate process control actions and reports. Monitoring based on data from imaging equipment can be provided for various reasons, can be applied to various types of materials, and can result a variety of actions. The material may comprise bulk material. Bulk materials are commonly understood as dry materials which are powdery, granular or lumpy in nature, and can be processed in large quantities. Non-limiting examples of materials include food substances, for example rice, grains, pulses, nuts, fruit, vegetables and so on. Other examples include polymeric materials, metallic materials and wooden materials, mixed materials, waste materials, and any other physical matter processed.

Handling based on the image data can comprise sorting of materials. Sorting is an established operation and covers a wide variety of material handling tasks that can be performed based on monitoring and resulting sorting of material in some way. For example, sorting can comprise tasks such as grading or categorisation of product streams and removal of unwanted items from product streams.

In addition to sorting, various analyses of materials may also be provided based on image data. Information may be generated abouts aspects such as quality, volume, quantity, particle size, mass, colour, type, moisture and so on. Information of other property related parameters may also be generated, e.g., amount damaged items, types of damages, product variations and so on.

There are numerous ways to sort and analyse a material flow and the above examples are not presented as an exhaustive list of sorting and analysing applications.

Sorting and analysing operations have conflicting requirements. A sorter operates in real-time as the material flows in the process and the processing of image data needs to be fast for the sorter be able to react. On the other hand, the analysis functionality needs to provide accurate results. The analysis does not necessarily need to be real-time. Because of the different requirements the current systems operate on the basis of separated sorting and analysis functions.

According to an aspect, there is provided a data processing apparatus for sorting apparatus, comprising a first data processing entity configured to operate a sorting application for processing of image data from a source of image data, a second data processing entity configured to operate an analysis application using a neural network for processing said image data from the source of image data, the second data processing entity being configured for processing of higher resolution image data than the first data processing entity, and an image data resolution converter configured to reduce the resolution of said image data from the source of image data prior to processing by the sorting application of the first data processing entity.

According to another aspect there is provided a method for sorting a flow of material, comprising processing image data from a source of image data by a first data processing entity configured to provide a sorting application, processing said image data from the source of image data by a second data processing entity using a neural network configured to provide an analysis application, wherein the method further comprises reducing the resolution of said image data from the source of image data prior to the processing by the sorting application, processing by the sorting application said reduced resolution image data, and processing by the analysis application the higher resolution image data.

The source of image data may comprise a high resolution digital imaging device.

A memory may be provided for buffering a part of the image data prior to processing by the second data processing entity. The second data processing entity can be configured to process subsets of the image data.

According to an aspect the sorting application and the analysis application can be trained based on same labelled images.

The apparatus can be configured to determine difference in classification by the sorting application and the analysis application of the same image data.

The determined differences may be taken into account in control of the sorting apparatus. At least one sorting parameter may be optimised based on the determined differences. New training data may be automatically generated for the classifier of the sorting application based on the determined differences.

The sorting application may be configured to use a first neural network and the analysis application is configured to use a second neural network.

The sorting application and/or the analysis application may be configured to use a convolutional neural network.

Flow of material can be smoothened by means of a feed forward type in-tray and a chute with a curved material receiving section. The material flow may be smoothened for the purposes of evening flow of material for the imaging and/or for operating of sorting equipment based on the data processing.

In accordance with an aspect there is provided a sorting apparatus comprising a data processing apparatus for generating sorting instructions, a feed-forward type in-tray and a chute comprising a curved section for receiving material from the feed-forward type in-tray. Separating of items in the smoothened material flow is based on control instructions from the data processing apparatus.

A computer software product may be provided for implementing the herein described methods and apparatuses.

Some aspects will now be described in further detail, by way of example only, with reference to the following examples and accompanying drawings, in which.

The following description gives an exemplifying description of some possibilities to practise the invention. Although the specification may refer to "an", "one", or "some" examples or embodiment(s) in several locations of the text, this does not necessarily mean that each reference is made to the same example of embodiment(s), or that a particular feature only applies to a single example or embodiment.

Single features of different examples and embodiments may also be combined to provide other embodiments.

Figure 1:
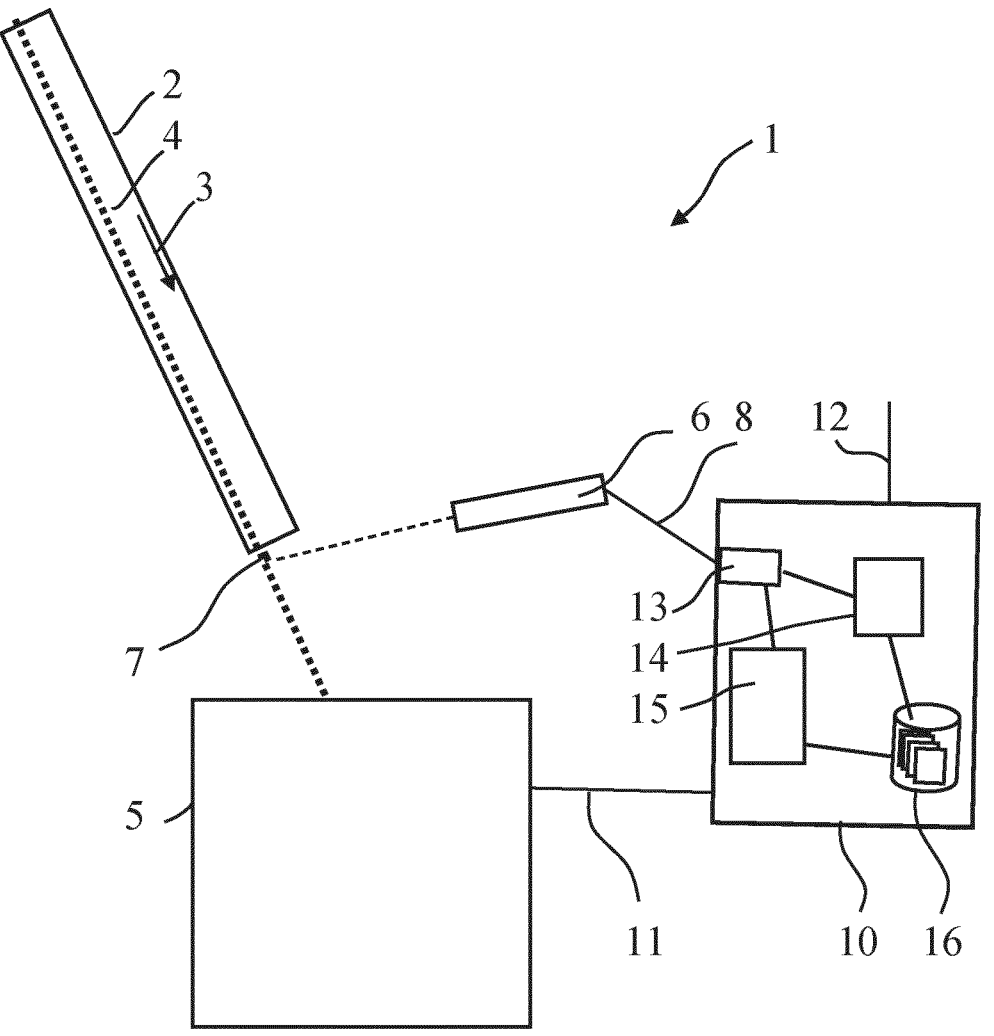
FIG. 1 illustrates a schematic example of a sorting apparatus.

FIG. 1 shows a side view of a schematic example of a processing system 1 configured to monitor granular material 4 flowing through the system. The processing system 1 comprises a chute 2 guiding the material 4 as indicated by arrow 3. It is noted that the schematic presentation of FIG. 1 shows the side of the chute 2 as transparent to make the material 4 visible whereas in real life implementations the interior of the chute may not be visible. Instead of, or in addition to a chute, the processing system may comprise a conveyor or other apparatus effecting flow of material in the system.

The chute 2 guides the material 4 to a material processing apparatus 5, for example equipment configured to sort the material into different streams or eject rejected objects from the flow of material. The material processing apparatus may process the material in various manners. For example, the material may be subjected to quality control actions where the material can be sorted such as accepted/rejected based on detection of impurities, misshaped objects, incorrectly sized objects, discoloured objects, damaged objects, variations, and so on. Other non-limiting examples include grading or categorisation of materials where different grades or varieties of material are separated based on control instructions from a control system. For example, food material or waste material may be divided into different material streams based on determined variety of matter by the material processing apparatus 5.

The material processing apparatus 5 is controlled via data link 11 by a controller system comprising a data processing apparatus 10. The control actions are at least in part based on image data via data link 8 from an imaging equipment 6. The imaging equipment comprises an imaging device, for example a digital camera, configured for imaging an imaging area 7 of a monitoring station. The term imaging area is used to refer to the field of view of the camera on the imaging plane. In line scan applications the imaging area is provided as a substantially narrow strip. This enables imaging for line scan applications and taking of direct images of the imaging area extending across the end of the chute. The line of sight from the camera to the imaging area is denoted by the dashed line. The imaging or viewing area 7 is typically a narrow strip extending over the width of free falling material flow emerging from the chute 2 and the camera is configured to image the entire length and width of the imaging areas so that all material 4 passing the imaging area is imaged.

The image captured by the optics of the camera is converted into a digital signal for input via the data connection 8 into the data processing apparatus 10. An interface 13 is provided for connecting the data processing apparatus to the camera. The interface component may also be used for selective resolution conversion tasks which will be explained later in more detail.

The data connections 8 and 11 can be any suitable wired or at least partially wireless data connection, and data can be communicated based on any appropriate data communication protocol. The data processing apparatus 10 can comprise any suitable computer device, for example a server, configured to perform the sorting, analysis and control functions described herein. The data processing apparatus 10 can be connected via the interface 12 to be a part of a wider data communications system, such as an Intranet or the Internet.

The data processing apparatus 10 can comprise any appropriate computing arrangement comprising at least one processor 14, 15, memory 16, software and internal circuitry and components necessary to perform the tasks configured to implement at least some of the herein described features. FIG. 1 shows only an example of internal components of a data processing apparatus arranged on a board and comprising processor(s) and memory or memories, and connections between the elements of the apparatus, and it shall be appreciated that function of a data processing apparatus can be arranged in various manners. The processors may be configured to execute an appropriate software code to implement one or more of the following aspects. The software code may be stored in at least one memory. The data processor apparatus can be connected to one or more cloud or virtualized environments. In accordance with a possibility at least a part of the task of the data processing apparatus 10 are provided based on cloud computing. Appropriate gateways can be provided between different environments.

The data processing apparatus can be configured for monitoring and control of a large scale production facility such as a factory or a food processing plant. For example, the data processing apparatus can be configured for food mills, various types of food processing applications, recycling plants, different raw material processing facilities and so on.

Artificial intelligence (AI) can be employed in performing the sorting and/or analysis functions. In accordance with an example AI is employed in the analysis but not in the sorting. When using methods that employ artificial intelligence (AI) implemented using one or more neural networks operated on modern graphics processing units (GPU) s with reasonable cost and complexity, the requirement of speed by the sorting function can be achieved if lower resolution input data is processed whereas good quality analysis functionality is achievable through higher resolution input data.

The sorting and analysis functions are currently provided through separated processing of sorting and analysis tasks. The sorting by nature has to be provided immediately and in real-time whereas the analysis allows some latency. However, using two separate sets of equipment can incur unnecessarily high cost, delays in obtaining the analysis results, and may cause extra mechanical handling of the product and complexity of the equipment.

The following describes certain aspects of efficient sorting of a product in a bulk material flow and simultaneous quality analysis of the product in the bulk material flow. Instead of using separate devices and stages for the sorting and analysis functions, a single stage sorting and analysis processing is provided based on the same image data. The image data is processed to adjust the resolution to accommodate the needs of the different applications. The data processing apparatus can be configured to have a first data processing entity configured to operate a sorting application for processing of image data from a source of image data. A second data processing entity configured to operate an analysis application using a neural network for processing said image data from the source of image data is also provided. The first data processing entity may also be configured to use a neural network. The second data processing entity may be configured to process the image data substantially simultaneously with the first data processing entity.

The second data processing entity is configured for processing higher resolution image data than the first data processing entity. This can be provided using an image data resolution converter configured to reduce the resolution of said image data from the source of image data prior to processing by the first data processing entity providing the sorting application.

Figure 2:
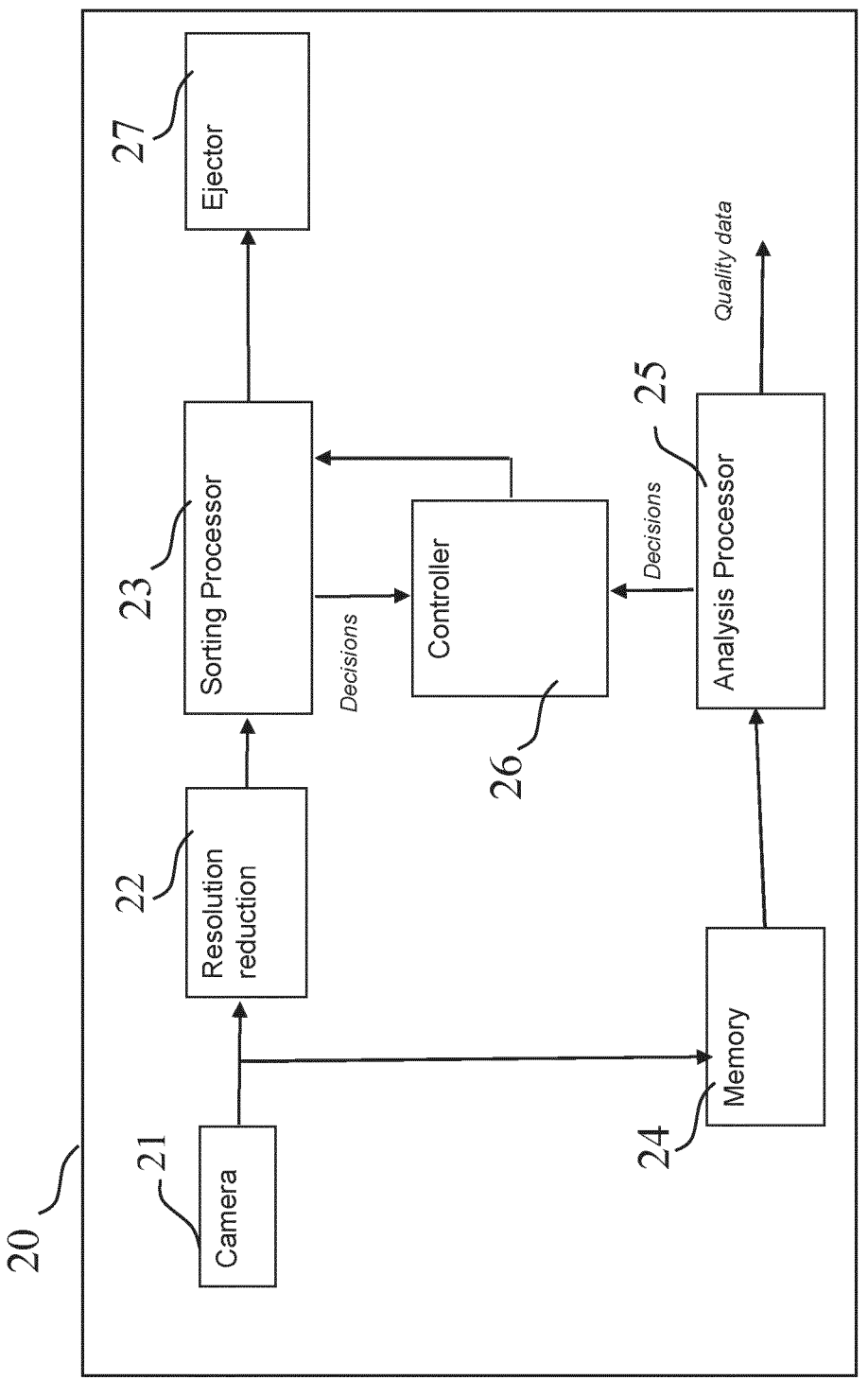
FIG. 2 is a schematic example of a possible system architecture according to the herein disclosed principles.

FIG. 2 shows a more detailed example for the architecture of a system 20 in accordance with the herein explained principles. A high-resolution camera 21 provides image data signal for use by AI methods for object detection and quality analysis using two separate data processing entities. Currently a typical image resolution for sorting applications is 0.3 mm/pixel. Analysis applications are typically based on use of higher resolutions, for example 0.15 mm/pixel or finer. The camera 21 can thus comprise a camera that generates a higher resolution image data output than is necessary for the sorting application, the output signal being processed such that it can be used for both the sorting application and analysis application. To provide this the sorting pathway can include a resolution reduction step 22 before input into the processing entity 23. The processing entity 23 processes all input data substantially in real-time. In accordance with a possibility the data processing entity 23 may be configured to provide the sorting based on use of AI for the decision making. The second data processing entity 25 is used in parallel for AI based analysis. The same camera data output can be used by both the sorting processor entity and the analysis processor entity. The analysis processor entity can output desired quality data regarding the monitored material.

An analysis processor may be provided that is fast enough to process the image data as quickly as the data arrives. In such case buffering prior to the analysis is not necessary. However, in certain scenarios there may be a significant lag (latency) on generating the output due to the length of the processing pipeline. To address a case where an analysis processor cannot keep up with the rate of capturing image data the analysis pathway can include a memory 24 for the purpose of buffering the data. The analysis processor 25 may be configured to process only a subset of the image data. In addition to, or as an alternative to buffering of the image data, some of the image data may be ignored.

The sorting processor entity can be arranged to control a sorting device 27, for example a reject ejector.

A central controller 26 can be provided for processing decision data from the first and second data processor entities 23, 25. As shown, the controller 26 can signal feedback to at least the first data processor entity 23. Examples of such feedback are described later in this description.

Feedback may also be provided to the second data processor entity, or another entity. The feedback can be useful for various purposes. For example, feedback from the analysis processor can be used in determining if there are differences in classification outputs between the sorting processor and the analysis processor. Significant differences may indicate that one of the processors is performing poorly.

The AI functions of processing entities 23 and 25 can be provided by convolutional neural networks (CNN). A CNN is a deep learning artificial layered neural network. CNNs are commonly applied to analyse visual imagery and are used for applications such as image and video recognition, recommender systems, image classification, object detection, and image segmentation. CNNs take advantage of the hierarchical patterns in data and assemble patterns of increasing complexity using smaller and simpler patterns embossed in their filters. CNNs use relatively little pre-processing compared to other image classification algorithms. The network learns to optimize the filters (or kernels) through automated learning, whereas in more traditional algorithms these filters are hand-engineered. This independence from prior knowledge and human intervention in feature extraction can provide advantage in applications such as sorting and analysis of bulk material flows.

Figure 3:
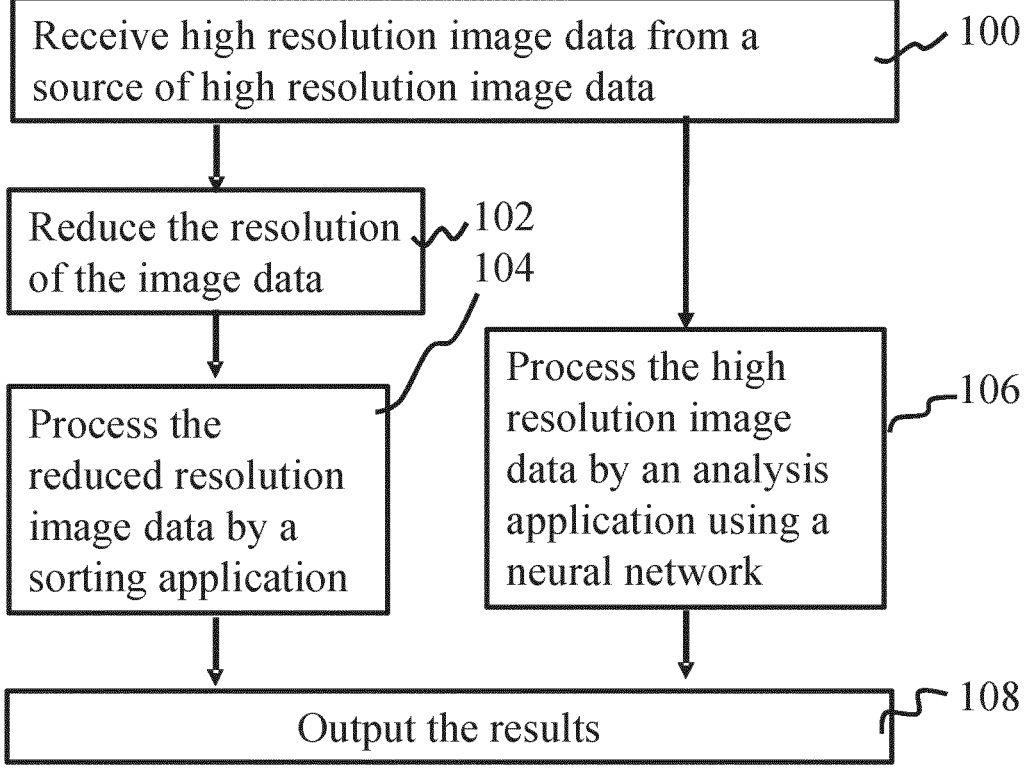
FIGS. 3 and 4 show flowcharts for operation according to certain examples.

FIG. 3 shows a flowchart for a method for a sorting equipment where high resolution image data is received at 100 from a source of high resolution image data, for example a digital camera or line scanner. The resolution of said image data is reduced at 102 prior to processing the reduced resolution image data at 104 by a first data processing entity configured to provide a sorting application. At the same time the high resolution image data is processed at 106 using a neural network of a second data processing entity configured to provide an analysis application. The processing at 106 can be separated in subsets of the image data. The results of the processing are output at 108.

Figure 4:
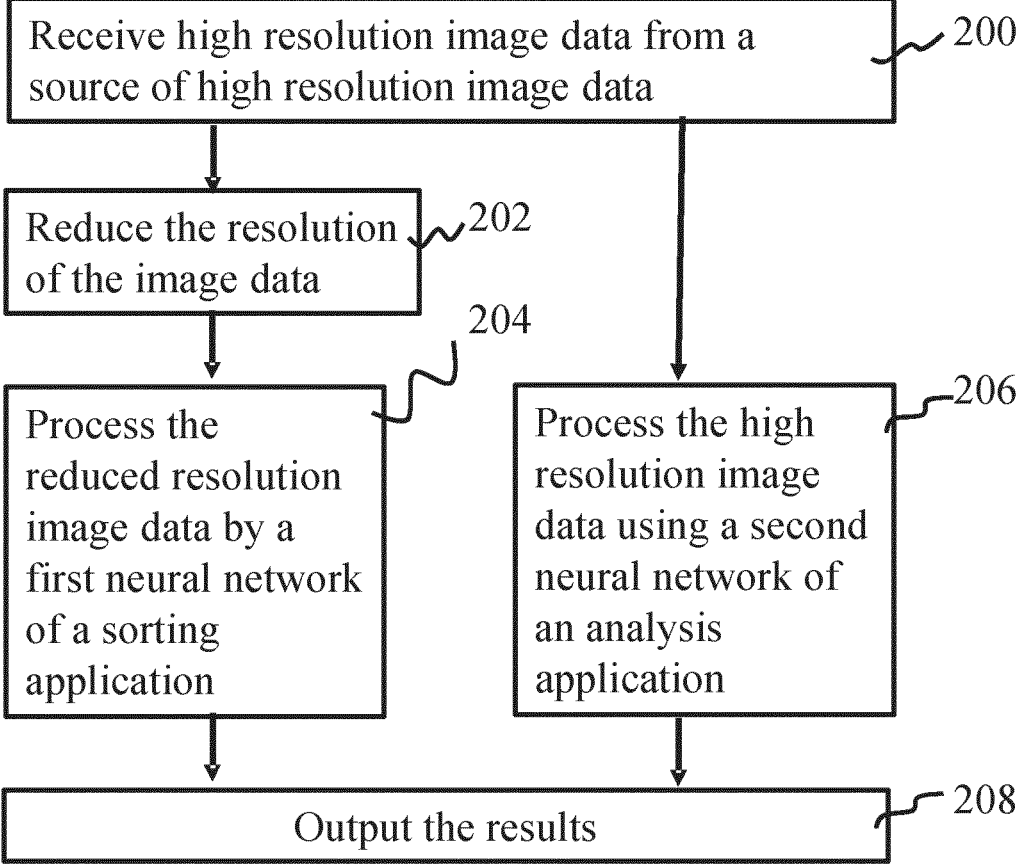

FIG. 4 shows a flowchart for arrangement where both processing entities are configured to provide neural networks. High resolution image data is received at 200 from a source of high-resolution image data. The resolution of said image data is reduced at 202 prior to processing the reduced resolution image data at 204 by a first data processing entity configured with a first neural network to provide a sorting application. At the same time the same high resolution image data is processed at 206 using a second neural network of a second data processing entity configured to provide an analysis application. The results of the processing are output at 208.

The herein explained principles can be particularly useful where the data processing for the sorter and the analyser both use convolutional neural networks (CNN). This can be so because the classifiers of the sorter and the analyser can be trained from the same labelled images. This can be advantageous because the step of creating labelled data to train the classifiers can be a limiting factor in the creation of new sorting and/or analysis applications. It is expected that the future sorting applications have more powerful processing capabilities and are thus expected to be suited for fast handling of high resolution image data substantially in real-time. When these become available, the existing labelled data can be used also for these high resolution sorting applications and the need for manually intensive retraining for the sorting AI applications can be reduced or eliminated altogether.

The method also facilitates comparison of the results from the sorting processor and the analysis processor as there is already an inherent correspondence between the two per se different processing applications. For example, the difference between the classification decisions from the two separate processing entities 23 and 25 of FIG. 2 can be used as feedback data to control and to optimise the parameters of the sorter. In FIG. 2 this is denoted by the feedback to the central controller 26. This can even be provided as runtime operation based on feedback data from the analyser processing entity to the sorting processor entity. Another example is to use the difference between the decisions of the two processors to automate generating new training data for the classifier of the sorting processor.

Figure 5:
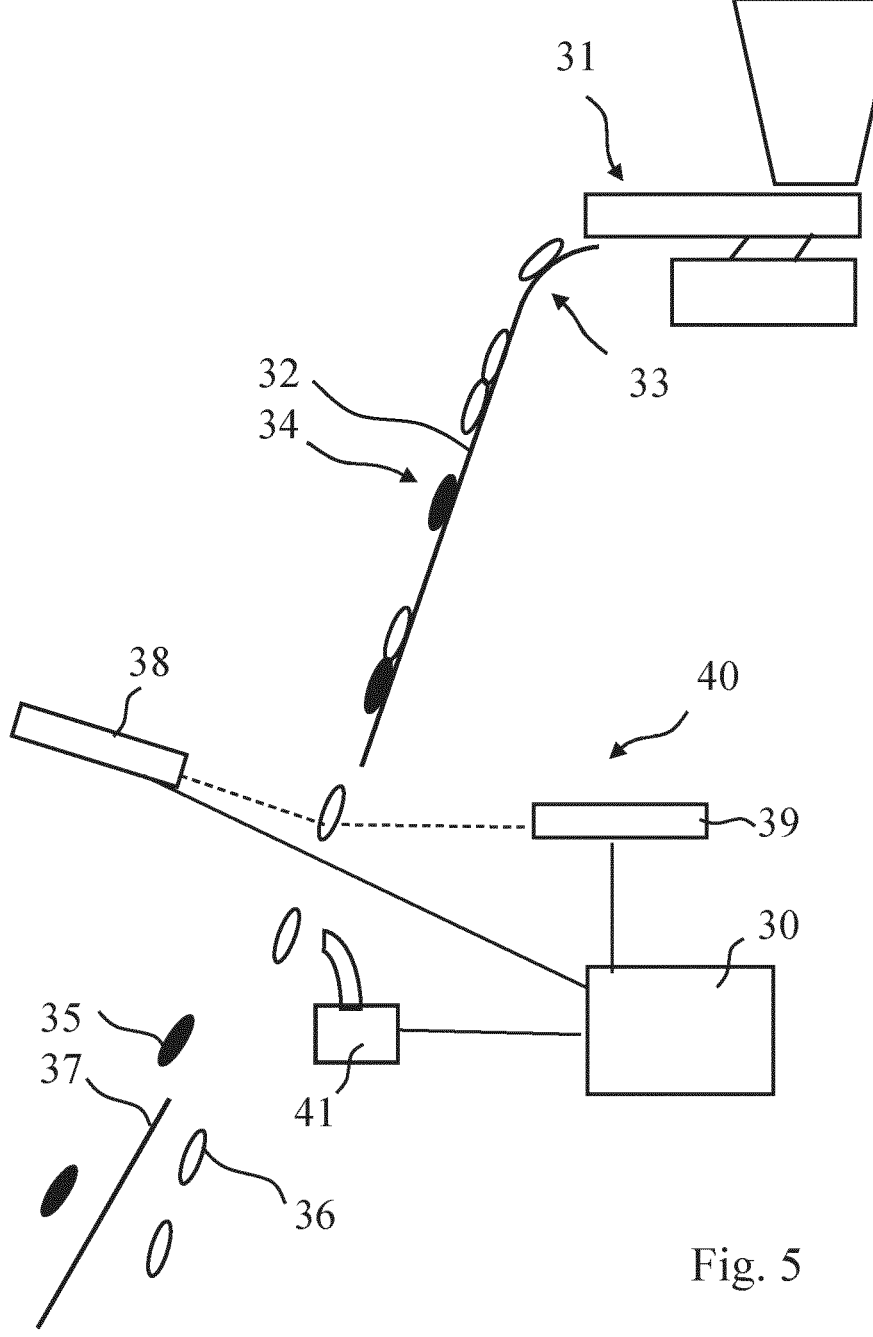
FIG. 5 shows another example of a sorting apparatus.

FIG. 5 shows an example of sorting apparatus comprising a feed-forward in-tray 31 feeding material 34 on a chute 32. The material receiving part on the top of the chute is provided with a curved chute section 33 arranged to smoothen the flow of material 34 fed on the chute. In operation the feed-forward tray 31 smoothly transfers the material directly onto the top of the chute without any reverse of direction, and then the curved chute smoothly transitions the direction of travel from horizontal to inclined.

The sorting apparatus further comprises equipment for removal or separation of unwanted material 35 from the stream. The separation equipment comprises a separation or ejection actuator 41 and cooperative separation plate 37. The actuator 41 is controlled by a data processing apparatus 30. The data processing apparatus is configured to generate control signals for the actuator 41 based on digital image data from an imaging system 40 as explained above. The actuator can be pneumatic such that in operation it blows air to reject items 35 such that the path of travel of the reject items is changed to guide them on the reject side of the edge of a separation plate 37. By means of this, items 35 determined as reject by the data processing apparatus 30 can be separated from the flow 34. Acceptable material items 36 are not affected and can continue their path of travel to the next processing stage.

Smoothening the flow of material 34 by the feed-forward tray 31 and the curved flow smoothening section 33 can provide a better visibility for the imaging system 40 to the material flowing through the imaging area. Furthermore, the smoothened flow makes it easier for the actuator 41 to correctly eject items 35 determined as being reject from the flow.

Such a feed mechanism may be advantageous, e.g., when the sorting processor comprises a convolutional neural network (CNN) implemented on a graphics processing unit (GPU). The "smoother" feed can be particularly useful for CNN-based sorting because this typically has a larger latency than non-CNN based methods. A larger latency may require a larger gap between the line of sight of the imaging device and the line where the sorting by the actuator 41 takes place based on the image data. Efficient sorting with a larger gap can benefit from the smoothened feed in reducing sorting mistakes due to increased possibility of good product tumbling into the reject channel or the ejectors missing the defects.

FIG. 5 shows also an imaging system 40 comprising more than one camera. In the example a double-sided viewing by two cameras 38 and 39 is provided after the material flow 34 has left the end of a chute 32. It is also possible to provide a single sided viewing-on-the-chute imaging arrangement where the material is imaged from one-side.

Imaging can be provided whilst the material is on the chute, or after the material has left the chute.

The herein described principles provide a sorting apparatus which has the capability to substantially simultaneously sort a product and analyse the quality of the product flowing through sorting equipment. An advantage is that the analysis can be made accurate while it is possible to provide low cost and complexity sorting implementation without impairing the efficiency, yield, and throughput of the sorting equipment. Also, training of future upgraded AI based sorting applications can be made more efficient. For example, upgrade from 0.3 mm pixel resolution application to 0.15 mm pixel resolution sorting application can be provided based on the already labelled image data without need of retraining or with minimal retraining.

It is noted that although the above detailed examples have been described with reference to certain processes, applications and machines there are several variations and modifications which may be made to the disclosed solution without departing from the scope of the present invention. In particular, the different embodiments have been described as examples. Different features from different embodiments may be combined.

The foregoing description provides by way of exemplary and non-limiting examples a full and informative description of exemplary embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the spirit and scope of this invention.

The invention claimed is:

1. A data processing apparatus for a sorting apparatus, comprising:

a first data processing entity configured to operate a sorting application for processing of image data from a source of image data;

a second data processing entity configured to operate an analysis application using a neural network for processing said image data from the source of image data, the second data processing entity being configured for processing of higher resolution image data than the first data processing entity; and an image data resolution converter configured to reduce the resolution of said image data from the source of image data prior to processing by the sorting application of the first data processing entity, wherein the first data processing entity is configured to process all input data substantially in real-time and is configured to provide the sorting based on use of artificial intelligence (AI) for decision making, and wherein the second data processing entity is used in parallel to the first data processing entity for the analysis application using the neural network.

2. The data processing apparatus according to claim 1, wherein the source of image data comprises a high resolution digital imaging device.

3. The data processing apparatus according to claim 1, further comprising a memory for buffering a part of the image data prior to processing by the second data processing entity, the second data processing entity being configured to process subsets of the image data.

4. The data processing apparatus according to claim 1, wherein the sorting application and the analysis application are trained based on same labelled images.

5. The data processing apparatus according to claim 1, configured to determine differences in classification by the sorting application and the analysis application of the same image data.

6. The data processing apparatus according to claim 5, configured to at least one of:

take the determined differences into account in control of the sorting apparatus, optimise at least one sorting parameter based on the determined differences, and automatically generate new training data for the sorting application based on the determined differences.

7. The data processing apparatus according to claim 1, wherein the sorting application is configured to use a first neural network and the analysis application is configured to use a second neural network.

8. The data processing apparatus according to claim 1, wherein at least one of the sorting application and the analysis application is configured to use a convolutional neural network.

9. A method for sorting a flow of material, comprising:

processing image data from a source of image data by a first data processing entity configured to provide a sorting application;

processing said image data from the source of image data by a second data processing entity using a neural network configured to provide an analysis application, wherein the method further comprises:

9
10 reducing the resolution of said image data from the source of image data prior to the processing by the sorting application;

processing by the sorting application said reduced resolution image data;

processing by the analysis application the higher resolution image data;

processing by the first data processing entity all input data substantially in real-time; and providing by the first data processing entity the sorting based on use of artificial intelligence (AI) for decision making, using the second data processing entity in parallel to the first data processing entity for the analysis application using the neural network.

10. The method according to claim 9, comprising receiving the image data from a high resolution digital imaging device.

11. The method according to claim 9, comprising buffering a part of the image data prior to processing by the neural network of the analysis application, and processing the buffered image data in subsets by the neural network.

12. The method according to claim 9, wherein the sorting application is configured to use a neural network for the sorting, the method comprising, training the neural network of the sorting application and the neural network of the analysis application based on same labelled images.

13. The method according to claim 9, comprising determining differences in classification by the sorting application and the analysis application based on the same image data.

14. The method according to claim 13, comprising at least one of:

using the determined differences in controlling sorting equipment, optimising at least one sorting parameter based on the determined differences, and generating automatically new training data for the sorting application based on the determined differences.

15. A sorting apparatus comprising:

a data processing apparatus comprising:

a first data processing entity configured to operate a sorting application for processing of image data from a source of image data;

a second data processing entity configured to operate an analysis application using a neural network for processing said image data from the source of image data, the second data processing entity being configured for processing of higher resolution image data than the first data processing entity; and an image data resolution converter configured to reduce the resolution of said image data from the source of image data prior to processing by the sorting application of the first data processing entity;

a chute comprising a curved material receiving section;

a feed-forward tray for feeding material on the curved material receiving section of the chute; and separation equipment for separating items in the material based on control instructions from the data processing apparatus, wherein the first data processing entity is configured to process all input data substantially in real-time and is configured to provide the sorting based on use of artificial intelligence (AI) for decision making, and wherein the second data processing entity is used in parallel to the first data processing entity for the analysis application using the neural network.

16. The sorting apparatus according to claim 15, wherein the first data processing entity comprises a convolutional neural network (CNN).

17. The sorting apparatus according to claim 16, wherein the first data processing entity comprises a graphics processing unit (GPU) for implementing the CNN.

18. The sorting apparatus according to claim 15, wherein the source of image data comprises at least two high resolution cameras.

19. The sorting apparatus according to claim 15, further comprising a memory for buffering a part of the image data prior to processing by the second data processing entity, the second data processing entity being configured to process subsets of the image data, wherein the sorting application is configured to use a first neural network and the analysis application is configured to use a second neural network and the sorting application and the analysis application are trained based on same labelled images.

20. The sorting apparatus according to claim 15, configured to determine differences in classification by the sorting application and the analysis application of the same image data, and configured further to at least one of:

take the determined differences into account in control of the sorting apparatus, optimise at least one sorting parameter based on the determined differences, and automatically generate new training data for the sorting application based on the determined differences.

* * * * *